(12) United States Patent
Weston et al.

(10) Patent No.: US 8,960,290 B2
(45) Date of Patent: Feb. 24, 2015

(54) METHOD FOR DELAYEDLY CROSSLINKING ENVIRONMENTALLY FRIENDLY FLUIDS

(75) Inventors: Melissa Weston, Duncan, OK (US); Jeremy Holtsclaw, Lawton, OK (US); David Loveless, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 220 days.

(21) Appl. No.: 13/329,844

(22) Filed: Dec. 19, 2011

(65) Prior Publication Data
US 2013/0153226 A1   Jun. 20, 2013

(51) Int. Cl.
*E21B 43/22*   (2006.01)
*E21B 43/26*   (2006.01)
*C09K 8/68*   (2006.01)

(52) U.S. Cl.
CPC ........... *C09K 8/685* (2013.01); *E21B 43/26* (2013.01)
USPC ............ 166/300; 166/305.1; 166/308.5

(58) Field of Classification Search
CPC .......... C09K 8/685; C09K 8/887; C09K 8/90; E21B 36/003; E21B 43/26; E21B 43/267
See application file for complete search history.

(56) References Cited

U.S. PATENT DOCUMENTS

| 1,078,370 | A | | 11/1913 | O'Connor |
|---|---|---|---|---|
| 3,629,229 | A | | 12/1971 | Schmank |
| 4,049,559 | A | * | 9/1977 | Grier et al. ............ 507/248 |
| 5,423,380 | A | | 6/1995 | Johnston et al. |
| 6,547,871 | B2 | | 4/2003 | Chatterji et al. |
| 7,159,659 | B2 | | 1/2007 | Welton et al. |
| 2006/0041028 | A1 | | 2/2006 | Crews |
| 2006/0180309 | A1 | | 8/2006 | Welton et al. |
| 2006/0180310 | A1 | | 8/2006 | Welton et al. |
| 2006/0183646 | A1 | | 8/2006 | Welton et al. |
| 2008/0280790 | A1 | | 11/2008 | Mirakyan et al. |
| 2009/0181865 | A1 | | 7/2009 | Dessinges et al. |
| 2009/0292081 | A1 | | 11/2009 | Suddaby |
| 2010/0022418 | A1 | | 1/2010 | Milne et al. |
| 2010/0197558 | A1 | | 8/2010 | Miralles et al. |
| 2011/0214859 | A1 | | 9/2011 | Loveless et al. |
| 2011/0214860 | A1 | | 9/2011 | Tonmukayakul et al. |
| 2013/0130947 | A1 | * | 5/2013 | Brannon et al. ............ 507/209 |

FOREIGN PATENT DOCUMENTS

| EP | 0604988 A2 | 7/1994 |
|---|---|---|
| WO | 2011107759 | 9/2011 |
| WO | 2013095800 A1 | 6/2013 |

OTHER PUBLICATIONS

International Search Report and Written Opinion for PCT/US2012/064135 dated Jan. 22, 2013.

* cited by examiner

*Primary Examiner* — Zakiya W Bates
(74) *Attorney, Agent, or Firm* — McDermott Will & Emery LLP; Craig W. Roddy

(57) ABSTRACT

The present invention relates to environmentally friendly delayed crosslinking complexes that are useful in subterranean treatment fluids. One embodiment of the present invention provides a method of providing a treatment fluid having a first viscosity and includes: an aqueous base fluid, a viscosifying agent, a delayed crosslinking complex having: a metal and a ligand, the ligand having at least one hydroxyl group and at least one carboxylic acid group; and placing the treatment fluid in a subterranean formation. In some embodiments, the delayed crosslinking complex is compliant and/or the viscosifying agent is compliant.

15 Claims, 8 Drawing Sheets

METHOD FOR DELAYEDLY CROSSLINKING ENVIRONMENTALLY FRIENDLY FLUIDS

BACKGROUND

The present invention relates to fluids useful for subterranean operations, and more particularly, to treatment fluids comprising an environmentally friendly delayed crosslinking complex, and methods of use employing such treatment fluids to treat subterranean formations.

Treatment fluids used in subterranean formations or "subterranean treatment fluids" may be any number of fluids (gaseous or liquid) or mixtures of fluids and solids (e.g., solid suspensions, mixtures and emulsions of liquids, gases and solids) used in subterranean operations. As used herein, the term "treatment," or "treating," refers to any subterranean operation that uses a fluid in conjunction with a desired function and/or for a desired purpose. The term "treatment," or "treating," does not imply any particular action by the fluid.

In some embodiments of the present invention, it is desirable to viscosify subterranean treatment fluids. Subterranean treatment fluids that may benefit from being viscosified include, but are not limited to, fracturing fluids, drilling fluids, diverting fluids, and gravel packing fluids. Increasing the viscosity of subterranean treatment fluids may be important for a number of reasons.

For example, an increase in a subterranean treatment fluid's viscosity can be important for transferring hydraulic pressure to divert treatment fluids to another part of a formation or for preventing undesired leak-off of fluids into a formation from the buildup of filter cakes. Drilling fluids are typically viscosified as drill cuttings will settle to the bottom of a wellbore if the viscosity is too low. An increase in a subterranean treatment fluid's viscosity may also useful in completion and stimulation operations as subterranean viscosified treatment fluids are typically used to carry particulates to specified locations in a subterranean formation for various purposes. For example, fracturing fluids typically require a sufficiently high viscosity in order to retain proppant particulates in suspension or at least to reduce the tendency of the proppant particulates to settle out of the fracturing fluid as the fracturing fluid flows along the created fracture.

The viscosified treatment fluids used in subterranean operations are oftentimes aqueous-based fluids comprising viscosifying agents. These viscosifying agents are typically polysaccharides which, when hydrated and at sufficient concentration, are capable of forming a viscous solution, often referred to as a gelled fluid. A number of polysaccharides may be used to help viscosify a treatment fluid for use in subterranean operations. These viscosifying agents may be crosslinked through an applicable crosslinking reaction comprising a crosslinking agent. Conventional crosslinking agents usually comprise a metal complex (e.g., aluminum sulfate) or other compound that interacts with at least two polymer molecules to form a "crosslink" between them. As used herein, the term "viscosified treatment fluids" does not imply any particular degree of crosslinking. In other words, a viscosified treatment fluid may have some degree of crosslinking or complete crosslinking.

However, the use of these crosslinking agents may give rise to other problems. For example, conventional crosslinking agents typically yield highly viscous fluids within a very short period of time, often seconds, which can lead to increased friction and reduced pumping rates for treatment fluids. In general, more viscous fluids require more power to pump, which translates to higher costs. Thus, these treatment fluid systems are often limited in their use to shallower, vertical wells. There are also some associated dangers and risks that arise from high friction pressures caused by highly viscous fluids.

Moreover, while some potential delayed crosslinking agents and methods have been identified, many of these are not environmentally friendly and in some embodiments of the present invention, non-compliant with current environmental regulations, especially those that may be in more stringent geographic areas such as the North Sea.

SUMMARY OF THE INVENTION

The present invention relates to fluids useful for subterranean operations, and more particularly, to treatment fluids comprising an environmentally friendly delayed crosslinking complex, and methods of use employing such treatment fluids to treat subterranean formations.

In some embodiments, the present invention provides methods comprising: providing a treatment fluid having a first viscosity comprising: an aqueous base fluid, a viscosifying agent, a delayed crosslinking complex comprising: a metal and a ligand, the ligand comprising at least one hydroxyl group and at least one carboxylic acid group; and placing the treatment fluid in a subterranean formation.

In other embodiments, the present invention provides methods comprising: providing a treatment fluid having a first viscosity comprising: an aqueous base fluid, a viscosifying agent, and a delayed crosslinking complex; placing the treatment fluid in a subterranean formation; and crosslinking the viscosifying agent with the delayed crosslinking complex, wherein the delayed crosslinking complex is compliant.

In still other embodiments, the present invention provides methods comprising: providing a viscosified treatment fluid in a subterranean formation, the viscosified treatment fluid comprising: an aqueous base fluid, a crosslinked gel, and a ligand selected from the group consisting of: a gluconate, a malate, a picolinate, a lactate, a citrate, an acetate, a tartrate, any derivatives thereof, and any combination thereof.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
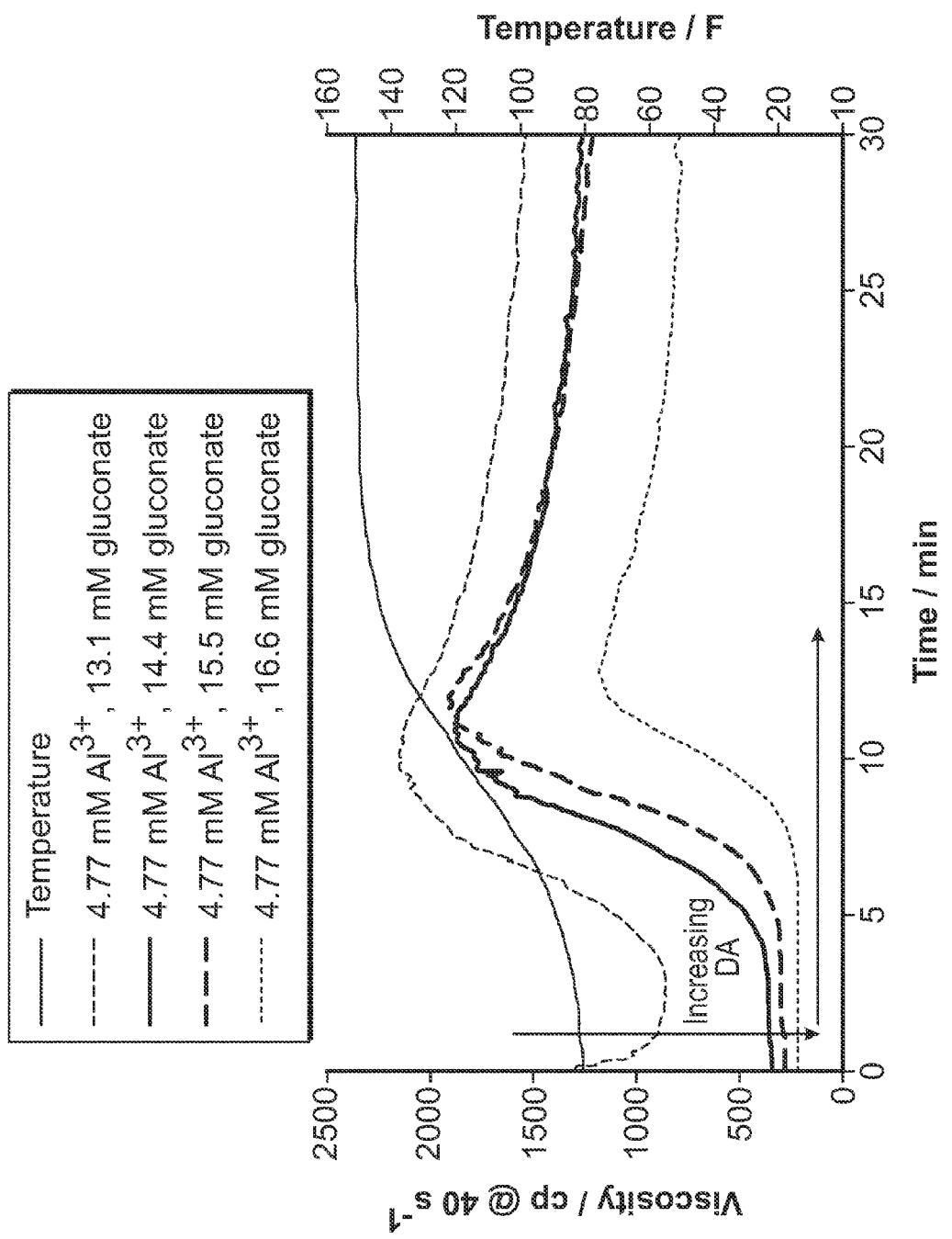
FIG. 1 shows a plot illustrating viscosity profiles according to some embodiments.

The present invention relates to fluids useful for subterranean operations, and more particularly, to treatment fluids comprising an environmentally friendly delayed crosslinking complex, and methods of use employing such treatment fluids to treat subterranean formations.

There are a number of advantages related to the present invention. The present invention provides compositions and methods for delayedly crosslinking viscosified treatment fluids. In some embodiments of the present invention, this delay may be on the order of minutes (from about a minute to about 10 minutes or more), which is substantial compared to the time scales of typical crosslinking observed in viscosified treatment fluids. Typical crosslinking of viscosified treatment fluids may be considered instant. In other words, the desired viscosity (e.g., ~3000 to 5000 cp at 40 $s^{-1}$ as described in Example 1) is usually reached irreversibly within seconds in a conventional viscosified treatment fluid. In some embodiments of the present invention, where desirable, the resultant delayed viscosified treatment fluids may have a peak viscosity that may be substantially lower (e.g., less than about 2500 CP at 40 $s^{-1}$) than the viscosities of typical viscosified treatment fluids. In some embodiments of the present invention, this lower peak viscosity may be due, at least in part, to the relatively higher pH's of the delayed crosslinking viscosified treatment fluids and/or presence of certain ligands. This delay in crosslinking provides advantages such as, but not limited to, reduction of pipe friction, faster pumping rates (e.g., to stimulate all of the perforation clusters during a particular stage), introduction of viscosified treatment fluids in deeper wells as well as longer horizontal wells (e.g., wells associated with shale fracturing), and the like.

The present invention may provide cost benefits as lower viscosity fluids generally require less power to pump. In some embodiments of the present invention, the treatment fluids of the present invention may use about 20% to about 40% less power than conventional viscosified treatment fluids. Thus, it may be desirable to delay the crosslinking of a treatment fluid until the treatment fluid is close to the area to be treated. Such delay allows the operator to introduce a non-crosslinked (and thus less viscous) fluid over a longer distance before having to add horsepower to place the more viscous, crosslinked treatment fluid.

In some embodiments, the viscosified treatment fluids of the present invention comprise a treatment fluid having a first viscosity comprising: an aqueous base fluid, a viscosifying agent, a delayed crosslinking complex comprising: a metal and a ligand, the ligand comprising at least one hydroxyl group and at least one carboxylic acid group. A delayed crosslinking complex generally comprises a suitable metal and a suitable ligand. In some embodiments, the viscosifying agent and/or the delayed crosslinking complex may be "compliant" or otherwise environmentally friendly. As used herein, the term "compliant" refers to materials described in 21 CFR §§170-199 updated April 2011 (substances approved as food items, approved for contact for food, or approved for use as an additive to food) and that are prepared from food-grade materials. In at least some embodiments, the use of such compliant materials potentially eliminates the need for costly procedures often required to dispose of the treatment fluids containing non-compliant materials and may help reduce negative impacts on the marine environment and groundwater.

The metal in the delayed crosslinking complex may generally be any metal that can interact with at least two polymer molecules (e.g., viscosifying agents) to form a "crosslink" between them. Suitable examples of metals include, but are not limited to, zirconium ions, titanium ions, aluminum ions, antimony ions, chromium ions, iron ions, borate ions, magnesium ions, copper ions, and zinc ions. In some embodiments, the metal may be compliant. Suitable sources of compliant metal ions include, but are not limited to, zirconium compounds contained within 21 CFR §§170-199, aluminum compounds contained within 21 CFR §§170-199, titanium compounds contained within 21 CFR §§170-199, chromium (III) compounds contained within 21 CFR §§170-199, iron (II) compounds contained within 21 CFR §§170-199, iron (III) compounds contained within 21 CFR §§170-199, copper compounds contained within 21 CFR §§170-199, zinc compounds contained within 21 CFR §§170-199, and combinations thereof.

A ligand suitable for use in the delayed crosslinking complexes of the present invention may be any substance capable of interacting with the metal ion to form a delayed crosslinking complex capable of delaying the crosslinking of a viscosifying agent to form a viscosified treatment fluid. Without wishing to be limited by theory, it is believed that the ligand may function by acting as a competitive ligand for the metal center of the crosslinking agent thereby forming a reversible delayed crosslinking complex afforded by the chemically liable bond between the metal ion and the ligand.

In some embodiments, the ligand comprises at least one hydroxyl group and at least one carboxylic acid group. In one preferred embodiment, the ligand comprises at least three hydroxyl groups and at least one carboxylic acid group (e.g., a gluconate or suitable derivatives thereof).

In some embodiments of the present invention, it is believed that the ligand may act to both protect the metal ion from forming insoluble particles and to act as a competitive ligand once the gel is formed. Without being limited by theory, it is believed that certain groups (e.g., hydroxyl groups) on the ligand have a stronger initial affinity (i.e., kinetically controlled) for the metal ions as compared to the viscosifying agents.

Suitable examples of compliant ligands include, but are not limited to, gluconates, malates, picolinates, lactates, citrates, acetates, tartrates, formates, propionates, butyrates, isobutyrates, malonates, succinates, sulfates, ethylenediaminetetraacetates, and the like. One of ordinary skill in the art, with the benefit of this disclosure, will recognize the appropriate ligand to include in a treatment fluid of the present invention based on, among other things, the temperature conditions of a particular application, the type of viscosifying agents used, the molecular weight of the viscosifying agents, the desired degree viscosity, and/or the pH of the treatment fluid.

In some embodiments, the ligand may be present in the delayed crosslinking complexes of the present invention in an amount in the range of from about 1:1 to about 1:10 ratio of crosslinking agent to ligand.

In some embodiments, the metal in the delayed crosslinking complexes of the present invention may be present in an amount from about 25 ppm to about 500 ppm in the treatment fluid. The concentrations of the metal and ligand may be modulated to control the desired viscosities (e.g., initial, final, peak, etc.) of the treatment fluid.

In some embodiments, the ligand may be present in the delayed crosslinking complexes of the present invention in an amount from about 25 ppm to about 5000 ppm. In some embodiments, the ratio of metal to ligand may be from about 1:1 to about 1:10. In some embodiments, the ratio of metalto-ligand in the delayed crosslinking complexes of the present invention may be about 1:2, 1:3, 1:4, 1:5, 1:6, 1:7, 1:8, or 1:9. In some preferred embodiments, the ratio may be about 1:3. The exact ratio may depend on a variety of factors including, the metal used, the ligand used, the desired viscosity (initial, final, peak, etc.), and the like.

Without being limited by theory, it is believed that the delayed crosslinking complexes of the present invention can release the metal ion once a certain temperature of the treatment fluid is reached, which is typically about 32° C. (90° F.) to about 38° C. (100° F.). The exact temperature may depend on factors such as, but not limited to, the ligand used in the delayed crosslinking complex, the concentration of metal in the delayed crosslinking complex, the ratio of metal to ligand used in the delayed crosslinking complex, the pH of the treatment fluid, as well as other factors known to those ordinarily skilled in the art having the benefit of this disclosure. It is also believed that the delayed crosslinking complexes of the present invention may be further delayed from releasing the metal ion by increasing the concentration of the ligand and/or increasing the environmental pH within a given range (from about pH 4.8 to about pH 5.6). The pH may also be modulated to control the desired viscosities (e.g., initial, final, peak, etc.) of the treatment fluid.

In some embodiments of the present invention, in the delayed crosslinking complexes of the present invention may be formed by mixing a suitable crosslinking agent (e.g., aluminum sulfate) and a suitable ligand source (e.g., sodium gluconate). In such embodiments, examples of suitable crosslinking agents include, but are not limited to, ferric chloride, boric acid, disodium octaborate tetrahydrate, sodium diborate, pentaborates, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, and titanium acetylacetonate, aluminum lactate, aluminum citrate, antimony compounds, chromium compounds, iron compounds, copper compounds, zinc compounds, and combinations thereof.

Examples of compliant crosslinking agents that may be used in the present invention include, but are not limited to, ammonium zirconium carbonate, zirconium citrate, zirconium lactate citrate, zirconium oxide, titanium dioxide, aluminum nicotinate, aluminum sulfate, aluminum sodium sulfate, aluminum ammonium sulfate, chromium caseinate, chromium potassium sulfate, zinc sulfate, zinc hydrosulfite, magnesium chloride, magnesium sulfate, magnesium gluconate, copper sulfate, and copper gluconate.

In certain embodiments of the present invention, the crosslinking agent may also be formulated to remain inactive until it is "activated" by, among other things, certain conditions in the fluid (e.g., pH, temperature, etc.) and/or interaction with some other substance. In some embodiments, the activation of the crosslinking agent may be further delayed by encapsulating the delayed crosslinking complexes of the present invention with a suitable coating (e.g., a porous coating through which the crosslinking agent may diffuse slowly, or a degradable coating that degrades downhole) that delays the release of the crosslinking agent until a desired time or place.

By way of example, the aqueous base fluid of the treatment fluids of the present invention may comprise any fluid comprising an aqueous component. Suitable aqueous components include, but are not limited to, fresh water, salt water, brine (e.g., saturated or unsaturated saltwater), seawater, pond water and any combination thereof. Generally, the aqueous component may be from any source. Suitable aqueous base fluids may include foams. In certain embodiments, the viscosifying agents of the present invention may be difficult to dissolve in brines. To solve this problem, in one embodiment of the present invention, the viscosifying agent may be hydrated in fresh water prior to addition of the salt solution. In some embodiments, the aqueous base fluid may be present in a treatment fluid of the present invention in an amount in the range of about 75% to about 99.9% of the treatment fluid. In some embodiments, fresh water may be the preferred aqueous base fluid.

In one preferred embodiment, the delayed crosslinking complex is a salt of gluconic acid comprising: a gluconate and a metal ion selected from the group consisting of: aluminum ions, zirconium ions, iron ions, titanium ions, chromium ions, antimony ions, and combinations thereof.

In certain embodiments, the delayed crosslinking complex may be formed prior to the treatment fluid being placed into the subterranean formation.

In other embodiments, the delayed crosslinking complex may form after the treatment fluid is placed in a subterranean formation. In some embodiments, the metal or metal source may be introduced after the introduction of the treatment fluid into a subterranean formation.

In some embodiments, the viscosifying agent comprises a viscosifying agent selected from the group of: xanthan, acrylate/methacrylate/vinyl phosphate containing acrylamide copolymers, carboxyethylcelluloses, carboxymethylcelluloses, carboxymethylhydroxyethylcelluloses, carboxymethylhydroxypropyl guars, carboxymethyl guars, derivatives thereof, and combinations thereof. Of these, compliant cellulosic viscosifying agents (as defined above) include, but are not limited to, carboxyethylcellulose, carboxymethylcellulose (CMC), carboxymethylhydroxyethylcellulose, any derivative thereof, and any combination thereof.

In certain embodiments, the viscosifying agent in the treatment fluids of the present invention may be compliant. Examples of compliant cellulosic viscosifying agents may also include any carboxylated cellulosic viscosifying agent capable of increasing the viscosity of the treatment fluids and capable of forming a crosslink in the presence of a crosslinking agent. The term "derivative" includes any compound that is made from one of the listed compounds, for example, by replacing one atom in the listed compound with another atom or group of atoms, rearranging two or more atoms in the listed compound, ionizing one of the listed compounds, or creating a salt of one of the listed compounds. The term "combination" includes any compounds that are made from two or more of the listed compounds (e.g., a copolymer of vinyl phosphate and acrylamide).

Viscosifying agents may be present in the treatment fluids useful in the methods of the present invention in an amount sufficient to provide the desired viscosity. In some embodiments, the viscosifying agents may be present in an amount in the range of from about 0.01% to about 15% by weight of the treatment fluid. In some preferred embodiments, the viscosifying agents may be present in an amount in the range of from about 0.3% to about 1% by weight of the treatment fluid.

In some embodiments, the treatment fluid may be any one of: a fracturing fluid, a gravel packing fluid, a completion fluid, a drilling fluid, and combinations thereof. In some embodiments, the treatment fluid may have a pH in the range of from about 4.8 to about 5.6. Generally, higher pH environments lead to longer delays in crosslinking of the viscosifying agents. In some embodiments, pH control additives may be used to maintain the pH of the treatment fluid at a desired level.

In some embodiments, the treatment fluids of the present invention may be foamed (e.g., comprising a gas such as nitrogen, carbon dioxide, air, or methane). As used herein, the term "foamed" also refers to fluids such as co-mingled fluids. In some embodiments, it may be desirable that the treatment fluid is foamed to, among other things, reduce the amount of fluid that is required in a water sensitive subterranean formation, to reduce fluid loss in the formation, and/or to provide enhanced proppant suspension. In examples of such embodiments, the gas may be present in the range of from about 5% to about 98% by volume of the treatment fluid, and more preferably in the range of from about 20% to about 90% by volume of the treatment fluid. The amount of gas to incorporate in the fluid may be affected by many factors including the viscosity of the fluid and the wellhead pressures involved in a particular application.

In some embodiments, other additives may optionally be included in the treatment fluids of the present invention. Examples of such additives may include, but are not limited to, salts, surfactants, breakers, biocides, fluid loss control agents, stabilizers, chelating agents, scale inhibitors, gases, mutual solvents, particulates, corrosion inhibitors, oxidizers, reducers, and any combination thereof.

Examples of suitable breakers for treatment fluids of the present invention include, but are not limited to, sodium chlorites, hypochlorites, perborate, persulfates, and peroxides, including organic peroxides. Other suitable breakers include, but are not limited to, suitable acids and peroxide breakers, delinkers, as well as enzymes that may be effective in breaking viscosified treatment fluids. In some preferred embodiments, the breaker may be a compliant breaker such as citric acid, other acids or chelating molecules found in 21 CFR §§170-199 (e.g. tetrasodium EDTA 175.300), oxidizers found in 21 CFR §§170-199 (e.g. ammonium persulfate 175.150), and enzymes found within 21 CFR §§170-199 (e.g. cellulose enzymes 173.120).

A breaker may be included in a treatment fluid of the present invention in an amount and form sufficient to achieve the desired viscosity reduction at a desired time. In some embodiments, the breaker may be formulated to provide a delayed break, if desired. For example, a suitable breaker may be encapsulated if desired. Suitable encapsulation methods are known to those skilled in the art. One suitable encapsulation method involves coating the selected breaker in a porous material that allows for release of the breaker at a controlled rate. Another suitable encapsulation method that may be used involves coating the chosen breakers with a material that will degrade when downhole so as to release the breaker when desired. Resins that may be suitable include, but are not limited to, polymeric materials that will degrade when downhole. Suitable encapsulation materials and methods are described in US 2011/0214859, the entirety of which is hereby incorporated by reference.

Other suitable breakers include compliant breakers such as ethyl formate, propyl formate, butyl formate, amyl formate, anisyl formate, methyl acetate, propyl acetate, triacetin, butyl propionate, isoamyl propionate, ethyl lactate, methyl butyrate, ethyl isobutyrate, butyl isobutyrate, diethyl malonate, butyl ethyl malonate, dimethyl succinate, diethyl succinate, diethyl malate, diethyl tartrate, dimethyl tartrate, triethyl citrate, and any combination thereof.

The treatment fluids of the present invention also may comprise fluid loss control agents. Examples of suitable fluid loss control agents include, but are not limited to, starches (as used herein, "starch" refers to a polysaccharide gum), silica flour, gas bubbles (energized fluid or foam), benzoic acid, soaps, resin particulates, relative permeability modifiers, degradable gel particulates, and other immiscible fluids.

Esters (e.g., triethyl citrate, ethyl formate, triethyl orthoformate, amyl formate, diethyl malate, etc.) can also be used as fluid loss liquids. These materials generate acid upon hydrolysis that helps in breaking the gel. In some embodiments of the present invention, like triethyl citrate, the material generates citric acid that chelates with metal ion in the fluid and breaks the fluid by taking away the metal crosslinker. A variety of organic acids are available in the form of esters that are compliant. Most of these are described as Synthetic Flavoring Substances and Adjuvants (21 CFR §172.515). Another example of a suitable fluid loss control additive is one that comprises a degradable material. If included, a fluid loss additive should be added to a treatment fluid of the present invention in an amount necessary to give the desired fluid loss control. In some embodiments, a fluid loss additive may be included in an amount of about 5 to about 2000 lbs/Mgal of the treatment fluid. In some embodiments, the fluid loss additive may be included in an amount from about 10 to about 50 lbs/Mgal of the treatment fluid. For some liquid additives that function as fluid loss additives, these may be included in an amount from about 0.01% to about 20% by volume; in some embodiments, these may be included in an amount from about 1.0% to about 10% by volume. Suitable compliant fluid loss control additives include ethyl formate, propyl formate, butyl formate, amyl formate, anisyl formate, methyl acetate, propyl acetate, triacetin, butyl propionate, isoamyl propionate, ethyl lactate, methyl butyrate, ethyl isobutyrate, butyl isobutyrate, diethyl malonate, butyl ethyl malonate, dimethyl succinate, diethyl succinate, diethyl malate, diethyl tartrate, dimethyl tartrate, triethyl citrate, and any derivative and combination thereof.

The treatment fluids of the present invention may comprise particulates, such as proppant particulates or gravel particulates. Such particulates may be included in the treatment fluids of the present invention, for example, when a gravel pack is to be formed in at least a portion of the well bore or a proppant pack is to be formed in one or more fractures in the subterranean formation.

Suitable materials for these particulates may include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, metasilicate, calcium silicate, kaolin, talc, zirconia, boron, fly ash, hollow glass microspheres, solid glass, and combinations thereof. The mean particulate size generally may range from about 2 mesh to about 400 mesh on the U.S. Sieve Series; however, in certain circumstances, other mean particulate sizes may be desired and will be entirely suitable for practice of the present invention. In particular embodiments, preferred mean particulate size distribution ranges are one or more of 6/12, 8/16, 12/20, 16/30, 20/40, 30/50, 40/60, 40/70, or 50/70 mesh. It should be understood that the term "particulate," as used in this disclosure, includes all known shapes of materials, including substantially spherical materials, fibrous materials, polygonal materials (such as cubic materials), and mixtures thereof. Moreover, fibrous materials, that may or may not be used to bear the pressure of a closed fracture, may be included in certain embodiments of the present invention. In certain embodiments, the particulates included in the treatment fluids of the present invention may be coated with any suitable resin or tackifying agent known to those of ordinary skill in the art. In certain embodiments, the particulates may be present in the treatment fluids of the present invention in an amount in the range of from about 0.5 pounds per gallon ("ppg") to about 30 ppg by volume of the treatment fluid.

In some embodiments, the treatment fluids of the present invention may include surfactants, e.g., to improve the compatibility of the treatment fluids of the present invention with other fluids (like any formation fluids) that may be present in the well bore. Suitable surfactants may be used in a liquid or powder form. Where used, the surfactants may be present in the treatment fluid in an amount sufficient to prevent incompatibility with formation fluids, other treatment fluids, or well bore fluids. In an embodiment where liquid surfactants are used, the surfactants are generally present in an amount in the range of from about 0.01% to about 5.0% by volume of the treatment fluid. In one embodiment, the liquid surfactants are present in an amount in the range of from about 0.1% to about 2.0% by volume of the treatment fluid. In embodiments where powdered surfactants are used, the surfactants may be present in an amount in the range of from about 0.001% to about 0.5% by weight of the treatment fluid.

In some embodiments, the surfactant may be a viscoelastic surfactant. These viscoelastic surfactants may be cationic, anionic, nonionic, amphoteric, or zwitterionic in nature. The viscoelastic surfactants may comprise any number of different compounds, including methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, ethoxylated amides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and combinations thereof. In certain embodiments, the surfactant may comprise a compliant surfactant such as sodium lauryl sulfate, polyoxyethylene (20) sorbitan monolaurate (commonly known as Polysorbate 20 or Tween 20), polysorbate 60, polysorbate 65, polysorbate 80, or sorbitan monostearate.

The methods and treatment fluids of the present invention may be used during or in preparation for any subterranean operation wherein a fluid may be used. Suitable subterranean operations may include, but are not limited to, drilling operations, fracturing operations, sand control treatments (e.g., gravel packing), acidizing treatments (e.g., matrix acidizing, fracture acidizing, removal of filter cakes and fluid loss pills), "frac-pack" treatments, well bore clean-out treatments, and other suitable operations where a treatment fluid of the present invention may be useful.

The methods of the present invention generally comprise: providing a treatment fluid having a first viscosity comprising: an aqueous base fluid, a viscosifying agent, a delayed crosslinking complex; and placing the treatment fluid in a subterranean formation.

In some embodiments, the delayed crosslinking complex delays the treatment fluid from forming a crosslinked gel having a second viscosity, the second viscosity being higher than the first viscosity prior to being placed in the subterranean formation.

In some embodiments, the delayed crosslinking complex delays the treatment fluid from forming a crosslinked gel having a second viscosity, the second viscosity being higher than the first viscosity after being placed in the subterranean formation.

To facilitate a better understanding of the present invention, the following examples of preferred embodiments are given. In no way should the following examples be read to limit, or to define, the scope of the invention.

EXAMPLE 1

The following treatment fluids were measured for their time and/or temperature dependent viscosity profiles.

A delayed crosslinking complex was prepared by making up a 0.9 mol/L $Al_2(SO_4)_3 \cdot 18H_2O$ and 2.29 mol/L sodium gluconate solution in tap water using volumetric flasks. 8 mL of the aluminum sulfate solution was combined with 18.9 mL of the sodium gluconate solution to obtain a 3:1 gluconate:Al molar ratio and allowed to quickly mix by manual shaking.

In a separate blender jar, 1.8 g sodium carboxymethyl cellulose (0.72% w/v) was added to 250 mL tap water (pH 7-8) with the shear on the blender set to 2,000 rev/min (Chandler constant-speed mixer). This resulted in an approximately 60 lb/Mgal CMC mixture. The mixture was stirred at this speed for ~30 sec. The speed was then reduced to 1,100 rev/min for ~30-60 min to hydrate the polymer. Hydration of the polymer was determined by measuring relative viscosity (about ~75 cp @ 511 $s^{-1}$).

A treatment fluid according to some embodiments was prepared by adding ~0.1% v/v of a 40% m/v NaOH solution (to obtain a pH ~10.5) and the delayed crosslinking complex (from above) at a concentration of 1% v/v (1 mL XL/100 mL gel) to the blender jar. The pH of this system was between 4.9 and 5.3. Viscosity profiles were generated using a Chandler 5550 viscometer, with a R1 rotor and B5X bob, using a sample volume of 44 mL, and at a shear rate of 40 $s^{-1}$.

FIG. 1 shows viscosity profiles for varying concentrations (13.1 mM, 14.4 mM, 15.5 mM, and 16.6 mM) of gluconate ligands while keeping the aluminum concentration constant (4.77 mM). The crosslinking agent and the ligand were premixed and added to ~0.7% w/v carboxymethyl cellulose in tap water.

Figure 2:
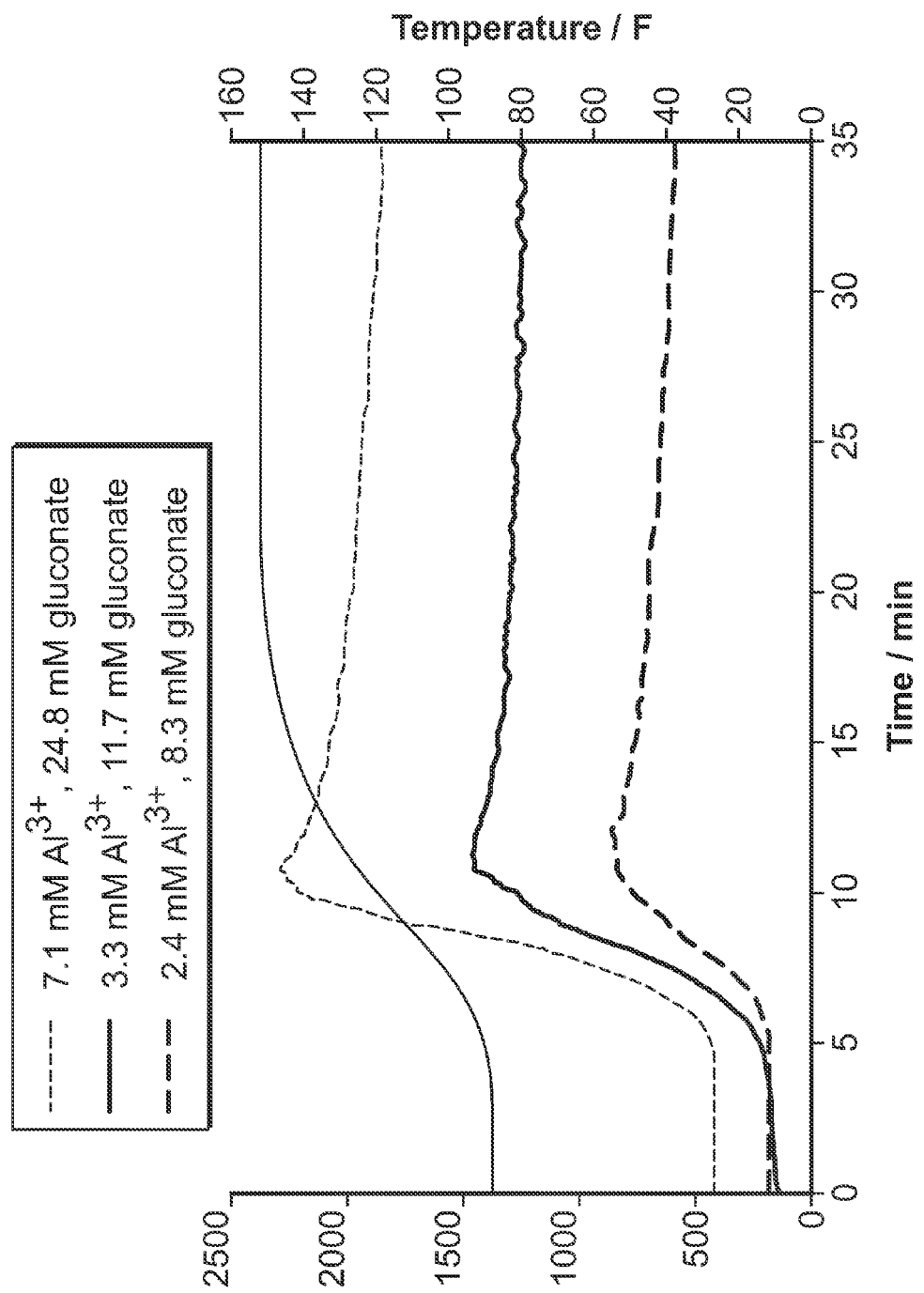
FIG. 2 shows a plot illustrating viscosity profiles according to some embodiments.

FIG. 2 shows viscosity profiles of a ~0.5% w/v carboxymethyl cellulose in tap water crosslinked with varying amounts of aluminum gluconate while maintaining a ratio of 3.5:1 gluconate:Al (pH ~5). The exact concentrations are shown in the Figure.

Figure 3:
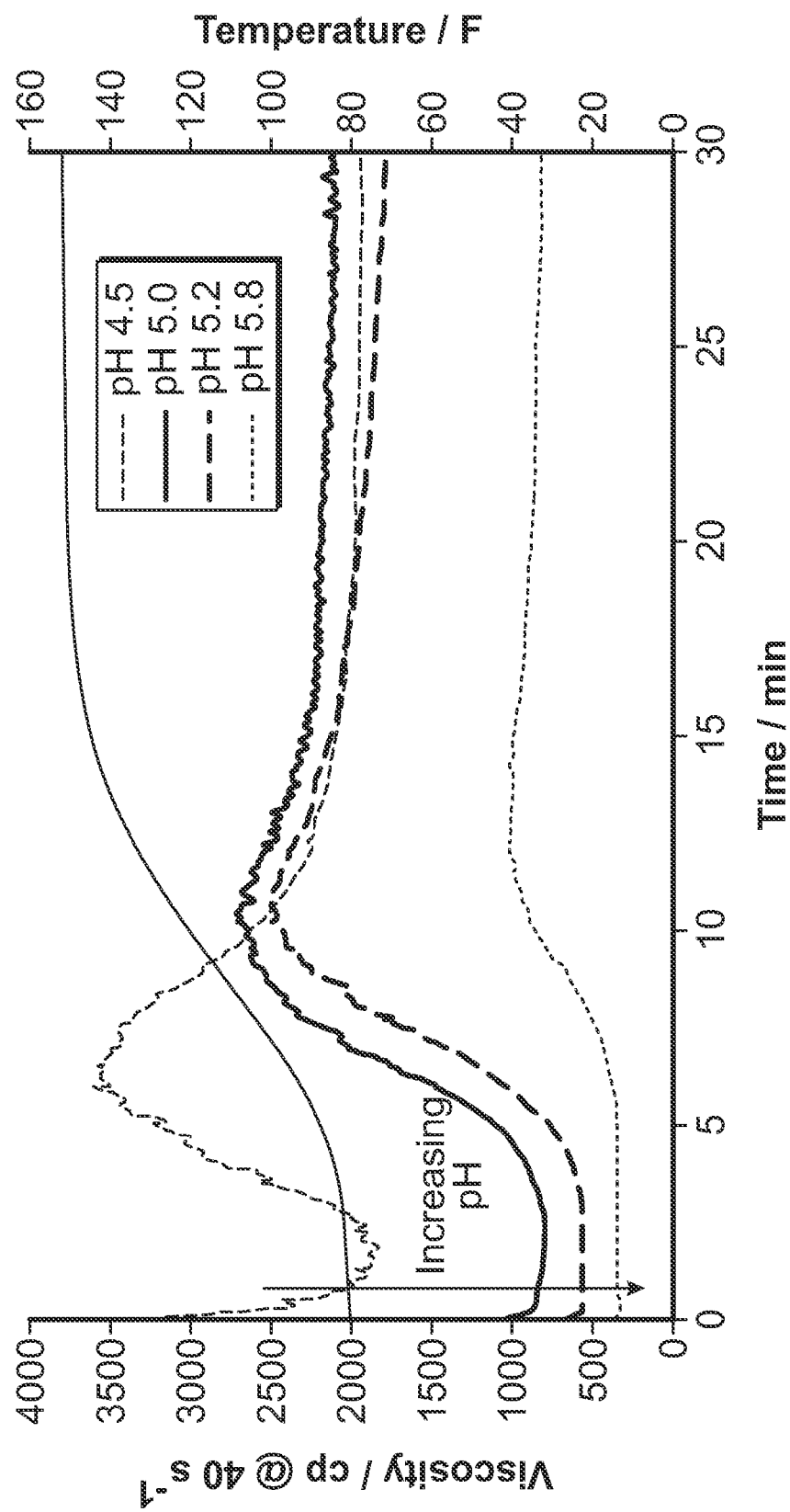
FIG. 3 shows a plot illustrating viscosity profiles according to some embodiments.

FIG. 3 shows viscosity profiles of a ~0.7% w/v carboxymethyl cellulose in tap water crosslinked with aluminum gluconate. The ratio of gluconate:Al was held at 3:1 (14.4 mM gluconate, 4.77 mM $Al^{3+}$) while varying the pH (pH 4.5, 5.0, 5.2, and 5.8).

Figure 4:
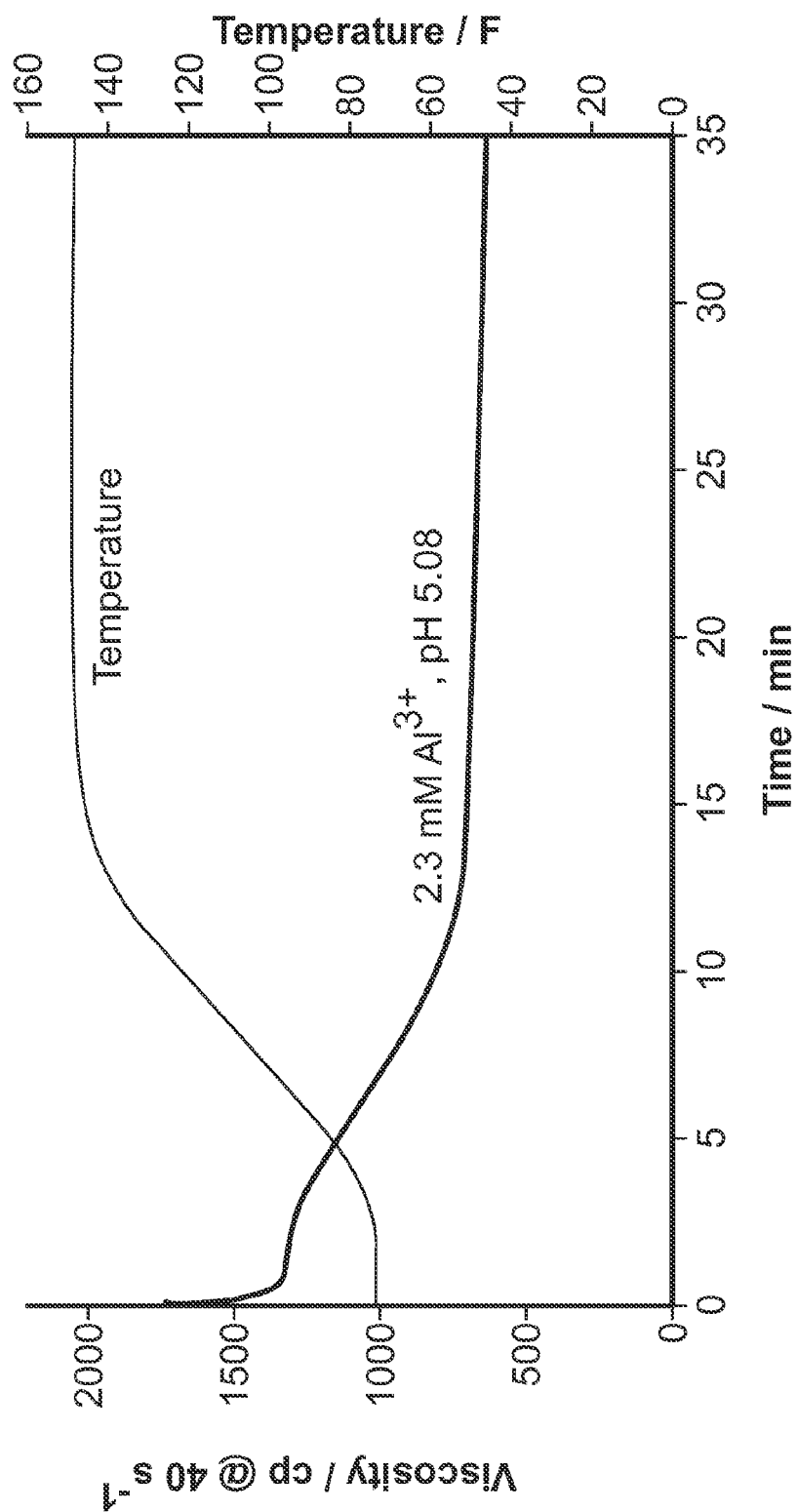
FIG. 4 shows a plot illustrating a viscosity profile of aluminum sulfate.

FIG. 4 shows a viscosity profile of a ~0.5% w/v carboxymethyl cellulose in tap water crosslinked with an instant crosslinker, aluminum sulfate (2.3 mM), at pH 5.

Figure 5:
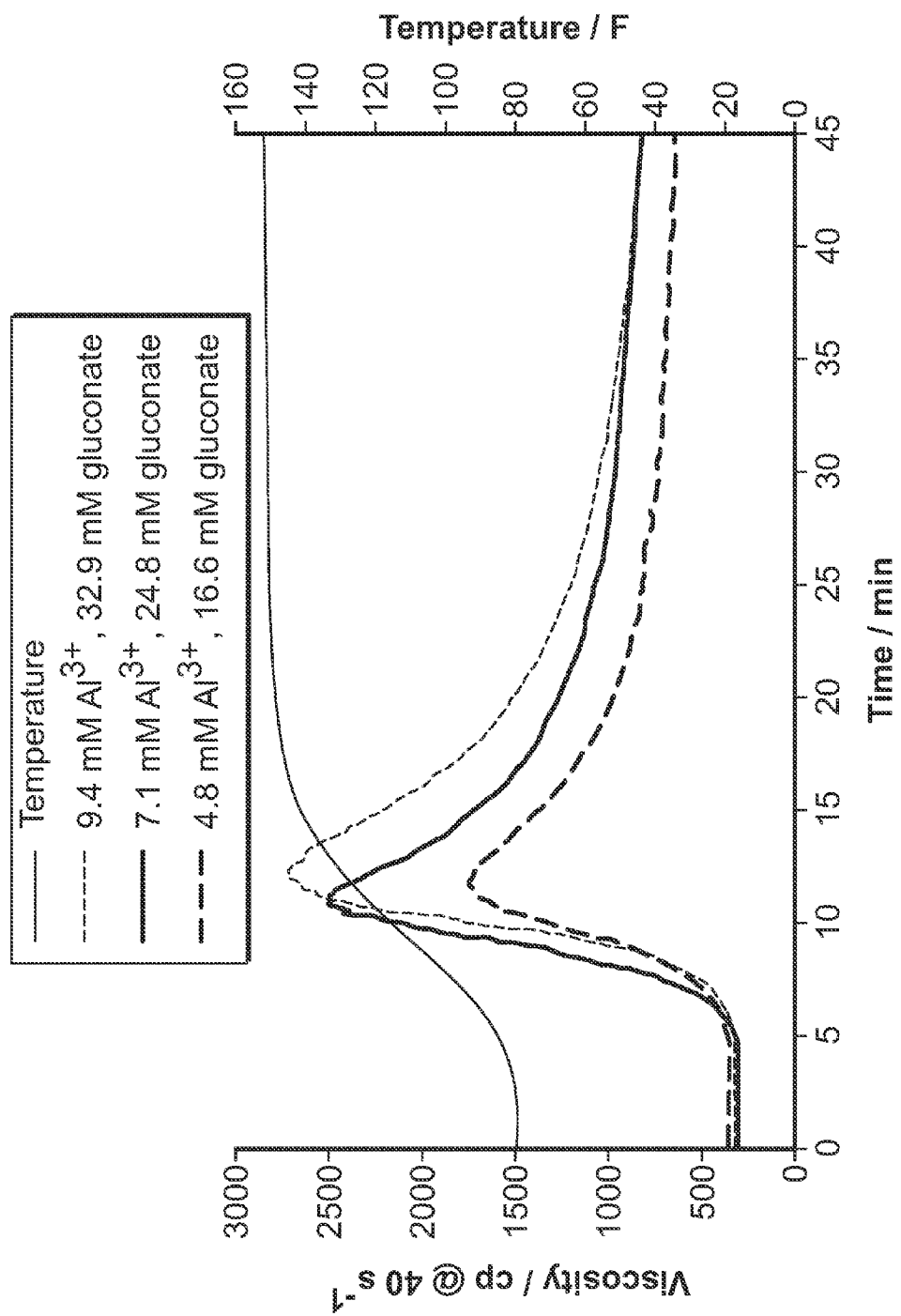
FIG. 5 shows a plot illustrating viscosity profiles according to some embodiments.

FIG. 5 shows viscosity profiles of a ~0.7% w/v carboxymethyl cellulose crosslinked with varying amounts of the aluminum gluconate at a 3.5:1 gluconate:Al ratio in the presence of 3% NaCl.

Figure 6:
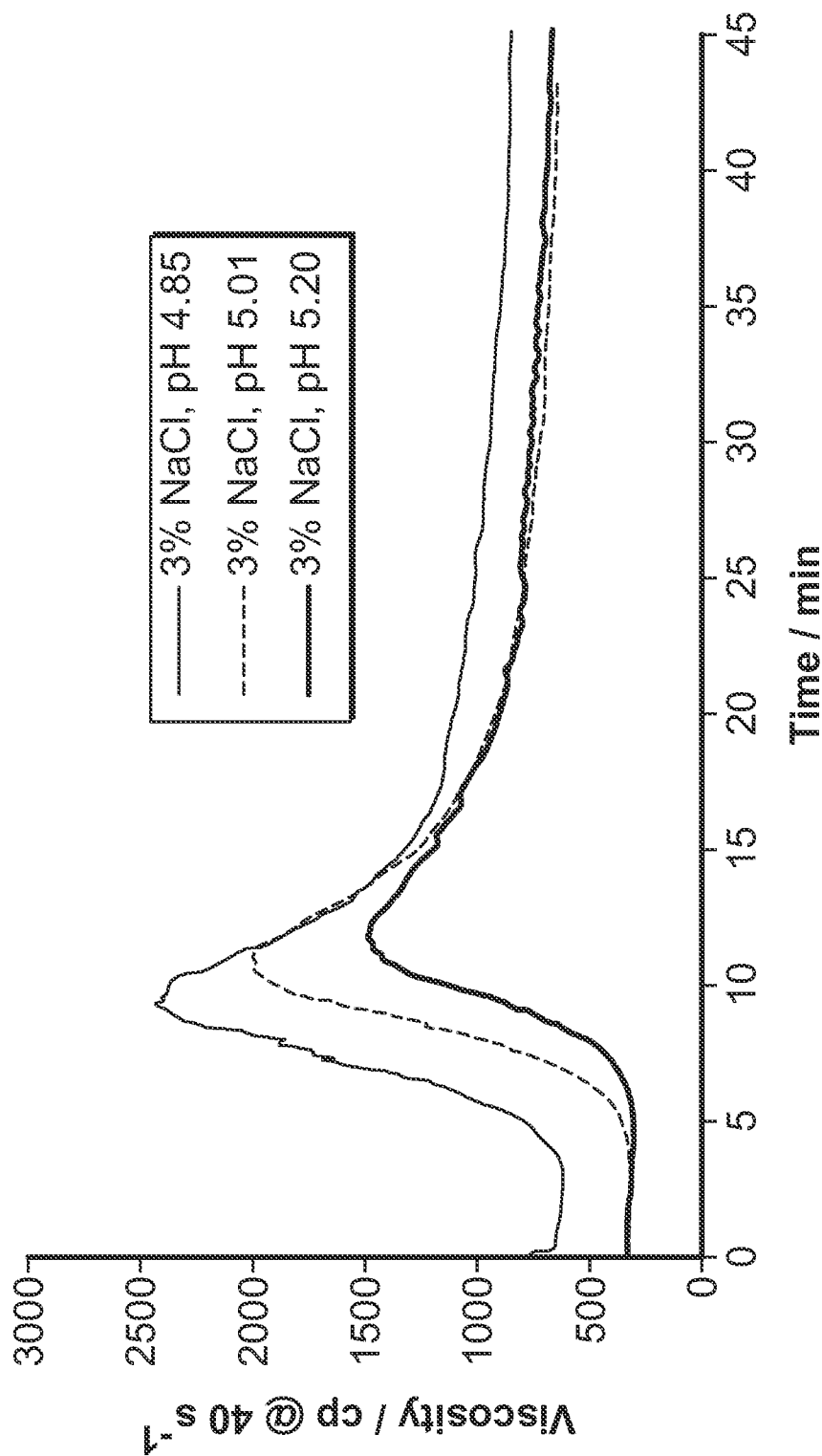
FIG. 6 shows a plot illustrating viscosity profiles according to some embodiments.

FIG. 6 shows viscosity profiles of a ~0.7% w/v carboxymethyl cellulose in tap water crosslinked with aluminum gluconate, at a 3.5:1 gluconate:Al ratio (16.6 mM gluconate, 4.77 mM $Al^{3+}$), at varying pH's in the presence of 3% NaCl.

Figure 7:
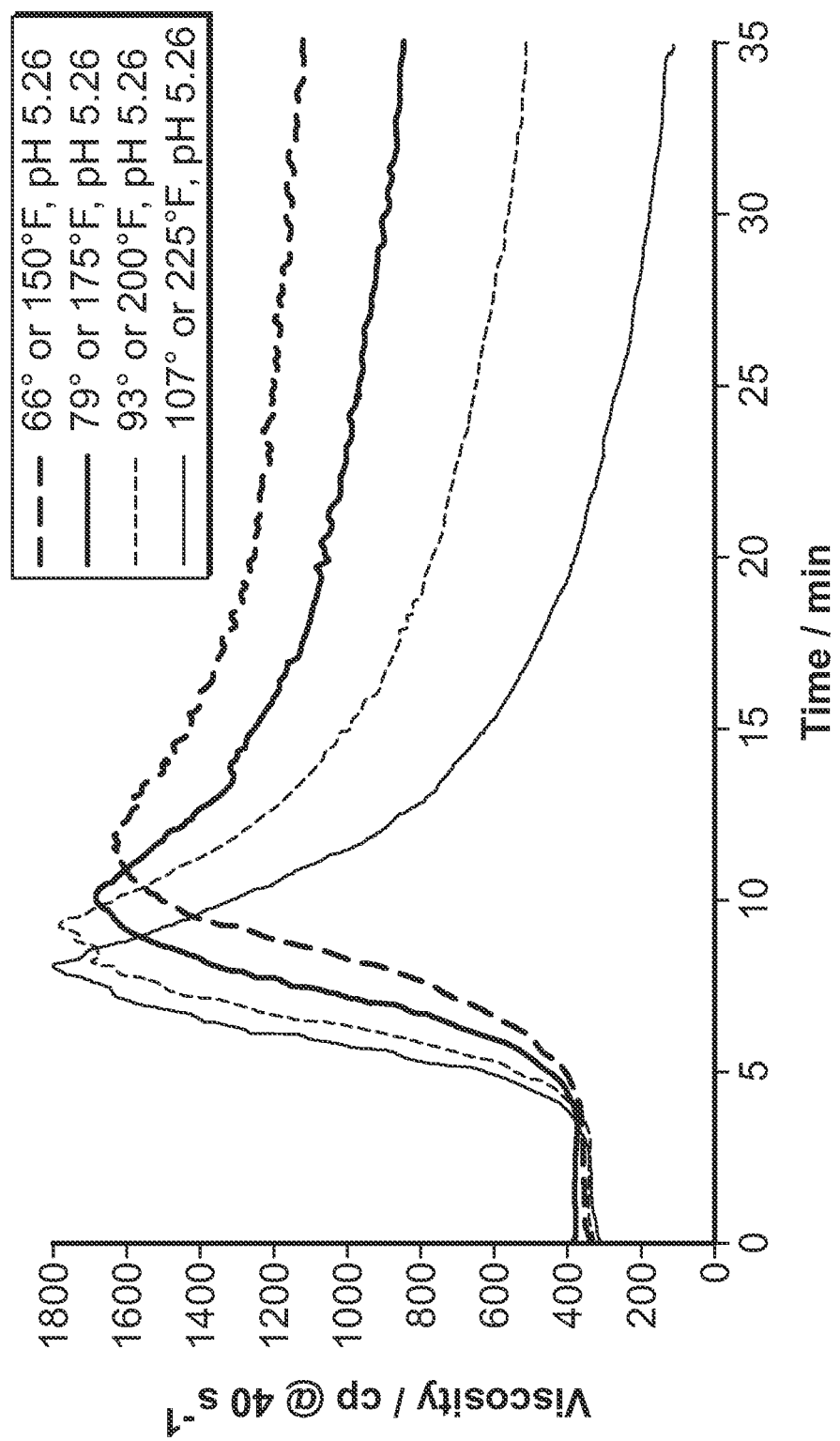
FIG. 7 shows a plot illustrating viscosity profiles according to some embodiments.

FIG. 7 shows viscosity profiles of a ~0.7% w/v carboxymethyl cellulose in tap water crosslinked with aluminum gluconate, at a 3:1 gluconate:Al ratio (14.4 mM gluconate, 4.77 mM $Al^{3+}$), at varying temperatures.

Figure 8:
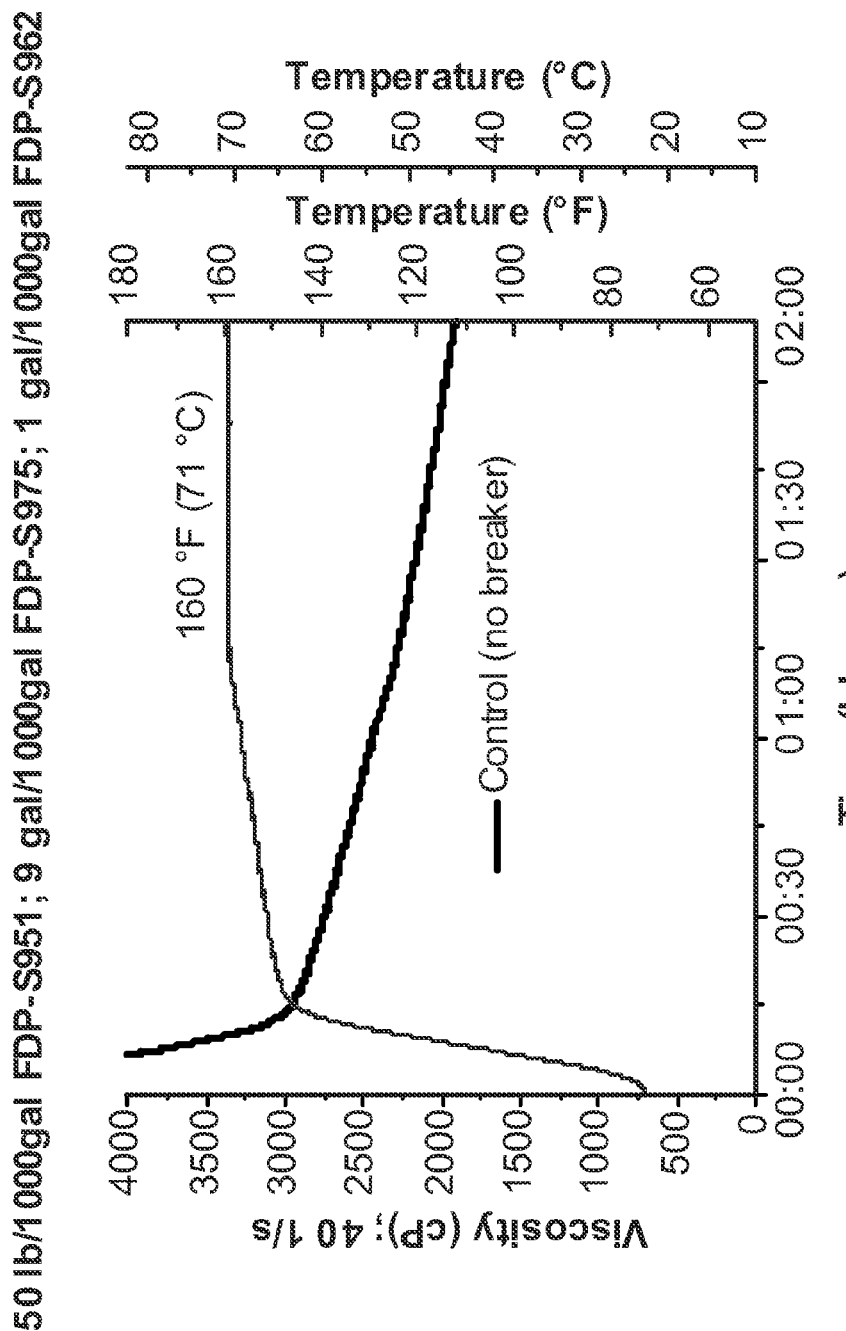
FIG. 8 shows a plot illustrating a viscosity profile of aluminum sulfate.

FIG. 8 shows a viscosity profile of a ~0.6% w/v carboxymethyl cellulose in tap water crosslinked with aluminum sulfate (2.55 mM $Al^{3+}$). This is a typical profile of the traditional instant crosslink system which results in very high friction pressures.

This Example demonstrates, among many things, that the delayed crosslinking complex such as aluminum gluconate may substantially delay crosslinking of gels compared to conventional crosslinking agents such as aluminum sulfate.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   providing a treatment fluid having a first viscosity comprising: an aqueous base fluid, a viscosifying agent, a delayed crosslinking complex comprising: a metal and a picolinate ligand; and
   placing the treatment fluid in a subterranean formation.

2. The method of claim 1 wherein the delayed crosslinking complex crosslinks the viscosifying agent to form a crosslinked gel after the treatment fluid is placed in the subterranean formation so as to form a viscosified treatment fluid having a second viscosity, the second viscosity being higher than the first viscosity prior to being placed in the subterranean formation.

3. The method of claim 2 wherein the crosslinked gel having a second viscosity is formed at a variable time from about 1 minute to about 10 minutes after placing the treatment fluid in the subterranean formation.

4. The method of claim 1 wherein the delayed crosslinking complex delays the treatment fluid from forming a crosslinked gel having a second viscosity, the second viscosity being higher than the first viscosity after being placed in the subterranean formation.

5. The method of claim 1 wherein the viscosifying agent comprises a viscosifying agent selected from the group consisting of: a xanthan, an acrylate, a methacrylate, a vinyl phosphate, an acrylamide, a carboxyethylcellulose, a carboxymethylcellulose, a carboxymethylhydroxyethylcellulose, a carboxymethylhydroxypropyl guar, a carboxymethyl guar, any derivative thereof, and any combination thereof.

6. The method of claim 1 wherein the delayed crosslinking complex includes a metal ion selected from the group consisting of: an aluminum ion, a zirconium ion, an iron ion, a titanium ion, a chromium ion, an antimony ion, and any combination thereof.

7. The method of claim 1 wherein the treatment fluid has a pH in the range of from about 4.8 to about 5.6.

8. The method of claim 1 wherein the treatment fluid comprises a treatment fluid selected from the group consisting of: a fracturing fluid, a gravel packing fluid, a completion fluid, a drilling fluid, and any combination thereof.

9. A method comprising:
   providing a treatment fluid having a first viscosity comprising: an aqueous base fluid, a viscosifying agent, and a delayed crosslinking complex comprising: a metal and a picolinate ligand;
   placing the treatment fluid in a subterranean formation; and
   crosslinking the viscosifying agent with the delayed crosslinking complex, wherein the delayed crosslinking complex is compliant.

10. The method of claim 9 wherein the delayed crosslinking complex crosslinks the viscosifying agent to form a crosslinked gel after the treatment fluid is placed in the subterranean formation so as to form a viscosified treatment fluid having a second viscosity, the second viscosity being higher than the first viscosity prior to being placed in the subterranean formation.

11. The method of claim 10 wherein the crosslinked gel having a second viscosity is formed at a variable time from about 1 minute to about 10 minutes after placing the treatment fluid in the subterranean formation.

12. The method of claim 9 wherein the delayed crosslinking complex delays the treatment fluid from forming a crosslinked gel having a second viscosity, the second viscosity being higher than the first viscosity after being placed in the subterranean formation.

13. The method of claim 9 wherein the crosslinking agent comprises a compound capable of supplying a metal ion selected from the group consisting of: an aluminum ion, a zirconium ion, an iron ion, a titanium ion, a chromium ion, an antimony ion, and any combination thereof.

14. The method of claim 9 wherein treatment fluid has a pH in the range of from about 4.8 to about 5.6.

15. The method of claim 9 wherein the treatment fluid comprises a treatment fluid selected from the group consisting of: a fracturing fluid, a gravel packing fluid, a completion fluid, a drilling fluid, and any combination thereof.

* * * * *